United States Patent [19]

Suzuki

[11] Patent Number: 5,787,789
[45] Date of Patent: Aug. 4, 1998

[54] VACUUM SERVO UNIT FOR A VEHICLE BRAKING SYSTEM

[75] Inventor: Kazuhiko Suzuki, Kariya, Japan

[73] Assignee: Aisin Seiki Kabushiki Kaisha, Kariya, Japan

[21] Appl. No.: 773,982

[22] Filed: Dec. 26, 1996

[30] Foreign Application Priority Data

Dec. 26, 1995 [JP] Japan ................... 7-339588

[51] Int. Cl.$^6$ .................................................. F15B 9/10
[52] U.S. Cl. .................................................. 91/376 R
[58] Field of Search ................... 91/369.2, 369.3, 91/376 R

[56] References Cited

U.S. PATENT DOCUMENTS

| | | | |
|---|---|---|---|
| 3,150,493 | 9/1964 | Rike | 91/376 R |
| 3,249,021 | 5/1966 | Wuellner | 91/376 R |
| 4,350,076 | 9/1982 | Thiel | 91/369.2 |
| 4,718,328 | 1/1988 | Mori et a. | 91/376 R |
| 4,729,286 | 3/1988 | Blot | 91/369.2 |
| 5,337,650 | 8/1994 | Uyama | 91/376 R |

*Primary Examiner*—F. Daniel Lopez
*Attorney, Agent, or Firm*—Burns, Doane, Swecker & Mathis, LLP

[57] ABSTRACT

The present invention is directed to a vacuum servo unit which is characterized in that a movable power piston has an outer cylindrical portion, an inner cylindrical portion, and a connecting portion for connecting an inner cylindrical portion to an outer cylindrical portion, the connecting portion has an input side end portion being shaped to be convex towards an input side so that a width in a peripheral direction thereof decreases towards the input side, a first path is provided in the connecting portion for communicating the variable pressure chamber with an inside space of the inner cylindrical portion, a second path is provided in the movable power piston for communicating the constant pressure chamber with the space between the outer cylindrical portion and the inner cylindrical portion. Accordingly, this vacuum servo unit can smoothly decrease the servo force for the movable power piston and the output force and restrain the production of the sound.

15 Claims, 7 Drawing Sheets

VACUUM SERVO UNIT FOR A VEHICLE BRAKING SYSTEM

FIELD OF THE INVENTION

Generally speaking, the present invention pertains to braking or clutch systems. More particularly, the present invention relates to a vacuum servo unit for a vehicle braking system or a clutch system.

BACKGROUND OF THE INVENTION

A conventional vacuum servo unit includes a housing in which is defined a pressure chamber, a movable wall member provided in the housing for dividing the pressure chamber into a constant pressure chamber communicating with a negative pressure source and a variable pressure chamber selectively communicating with the atmosphere and the constant pressure chamber, and a movable power piston integrally connected with the movable wall member. An annular negative pressure controlling valve seat is provided with the movable power piston, and an input member is provided in the movable power piston for axial movement upon brake actuation. An annular atmosphere controlling valve seat is provided on the input member. An output member outputs a propulsion force on the movable power piston in association with movement of the movable wall member. A control member cooperates with the annular negative pressure controlling valve seat and the annular atmosphere controlling valve seat to selectively communicate the variable pressure chamber with the negative pressure source or with the atmosphere according to the movement of the input member against the movable power piston.

Figure 8:
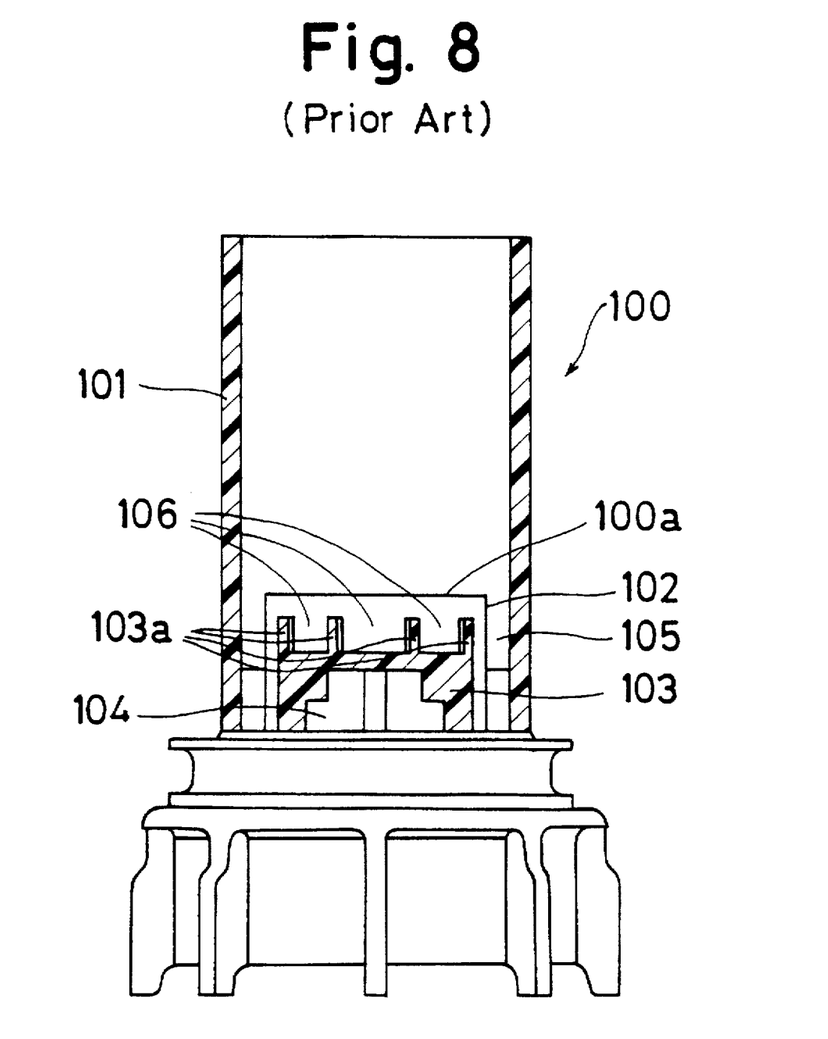
FIG. 8 is a partly cross-sectional view of the movable power piston in accordance with a conventional vacuum servo unit.
Figure 9:
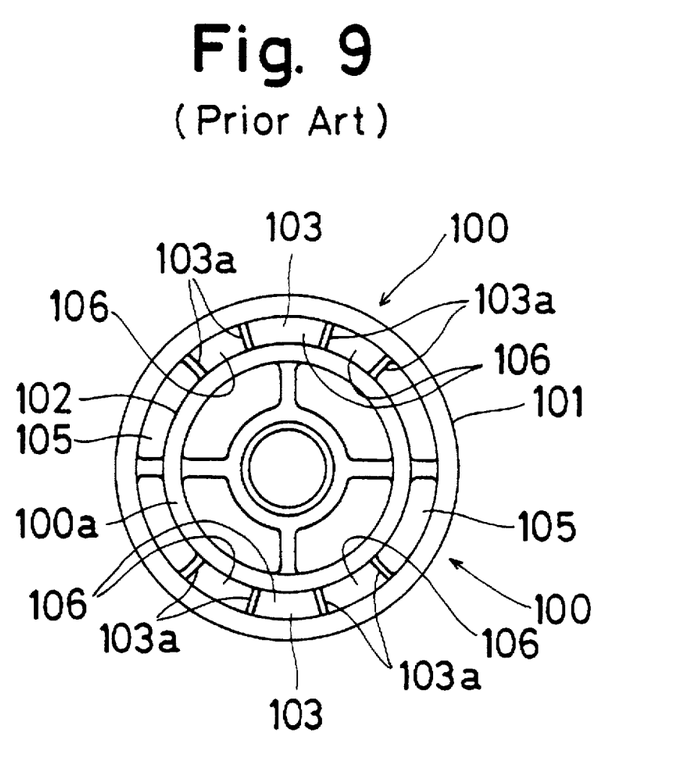
FIG. 9 is an upper view of the movable power piston shown in FIG. 8.

FIG. 8 illustrates a partial cross-sectional view of a movable power piston, according to a conventional vacuum servo unit. FIG. 9 is a top view of the movable power piston shown in FIG. 8. In FIG. 8 and FIG. 9, the movable power piston 100 has an outer cylindrical portion 101, an inner cylindrical portion 102, and two connecting portions 103. The outer cylindrical portion 101 slides into the input side wall of the housing (not shown). The inner cylindrical portion 102 is provided concentrically within the outer cylindrical portion 101. The connecting portion 103 connects the outer peripheral portion of the inner cylindrical portion 102 to the inner peripheral portion of the outer cylindrical portion 101.

An annular negative pressure controlling valve seat 100a is provided on the input side portion of the inner cylindrical portion 102. A first path 104 and a second path (not shown) are provided in the connecting portions 103 for communicating the variable pressure chamber (not shown) with the inside space of the inner cylindrical portion 102 at all times, and respectively extend towards the radial direction of the movable power piston 100. The second path (not shown) is provided in the movable power piston 100 for communicating a space 105 between the outer peripheral portion of the inner cylindrical portion 102 and the inner peripheral portion of the outer cylindrical portion 101 with the constant pressure chamber (not shown) at all times. The illustrated connecting portion 103 has four ribs 103a at its input side. Each of the four ribs 103a extends straight towards the input side to maintain a definite width in the peripheral direction thereof, i.e., the sideways direction in FIG. 8. Each of the four ribs 103a connects the inner cylindrical portion 102 to the outer cylindrical portion 101 the same as the connecting portion 103. In the other connecting portion 103, four ribs are provided in the same way. Each of the connecting portions 103 is of such a shape that the input side portion of the connecting portion 103 is partly removed, which can make the movable power piston 100 lighter.

In this vacuum servo unit, when the annular negative pressure controlling valve seat 100a is out of engagement with the control member (not shown) and the atmosphere controlling valve seat (not shown) is in engagement with the control member by brake actuation, the variable pressure chamber (not shown) communicates the constant pressure chamber (not shown) through the first path 104, the inside space of the inner cylindrical portion 102, the clearance between the annular negative pressure controlling valve seat and the control member (not shown), the space 105 between the outer cylindrical portion 101 and the inner cylindrical portion 102, and the second path. Thus, the atmospheric air in the variable pressure chamber flows into the constant pressure chamber so that the pressure differential between the variable pressure chamber and the constant pressure chamber is decreased, and the output force of the vacuum servo unit is decreased.

However, in the foregoing vacuum servo unit, when the atmospheric air in the variable pressure chamber passes through the space 105 between the outer peripheral portion of the inner cylindrical portion 102 and the inner peripheral portion of the outer cylindrical portion 101 to flow from the variable pressure chamber to the constant pressure chamber, the atmospheric air hits against the connecting portions 103 and ribs 103a, and flows into the space 106 surrounded by the outer peripheral portion of the inner cylindrical portion 102, the inner peripheral portion of the outer cylindrical portion 101, and ribs 103a. As a result, the stream of atmospheric air is disturbed, which prevents the atmospheric air from smoothly moving from the variable pressure chamber to the constant pressure chamber, prevents the vacuum servo unit from smoothly decreasing the output force, and causes undesirable noise.

SUMMARY OF THE INVENTION

Accordingly, a need exists for a vacuum servo unit that is able to obviate the aforementioned drawbacks associated with conventional vacuum servo units. That is, a need exists for a vacuum servo unit designed so that atmospheric air flows smoothly from the variable pressure chamber to the constant pressure chamber, thus avoiding creation of undesirable noise.

In light of the foregoing, an aspect of the present invention involves a vacuum servo unit for a vehicle braking system that includes a housing in which a pressure chamber is defined. A movable wall member is provided in the housing to divide the pressure chamber into a constant pressure chamber adapted to communicate with a negative pressure source and a variable pressure chamber adapted to selectively communicate with the atmosphere or with the constant pressure chamber. A movable power piston is connected with the movable wall member and has an outer cylindrical portion, an inner cylindrical portion, and a connecting portion. The outer cylindrical portion is adapted to slide into the input side wall of the housing. The inner cylindrical portion is disposed concentrically within the outer cylindrical portion. The connecting portion connects the outer peripheral portion of the inner cylindrical portion to the inner peripheral portion of the outer cylindrical portion. An annular negative pressure controlling valve seat is provided on the input side end portion of the inner cylindrical portion. A first path is provided in the connecting portion for communicating the variable pressure chamber with an inside space of the inner cylindrical body at all times and extends towards the radial direction of the movable power piston. An input member is provided in the inner cylindrical portion of the movable power piston and is axially movable upon brake actuation. An annular atmosphere controlling valve seat is provided on the input member. A second path is provided in the movable power piston and communicates the space between the inner peripheral portion of the outer cylindrical portion and the outer peripheral portion of the outer cylindrical portion with the constant pressure chamber at all times. An output member outputs a propulsion force on the movable power piston accompanying the movement of the movable wall member to outside the unit. A control member cooperates with the annular negative pressure controlling valve seat and the annular atmosphere controlling valve seat to selectively communicate the inside space of the inner cylindrical position with the space between the inner peripheral portion of the outer cylindrical portion and the outer peripheral portion of the inner cylindrical portion or with the atmosphere according to the movement of the input member against the movable power piston. An input side end portion of the connecting portion is shaped to be convex towards an input side so that its width in the peripheral direction decreases towards the input side.

According to another aspect of the present invention, a vacuum servo unit for a vehicle braking system includes a housing in which is defined a pressure chamber, a movable wall member provided in the housing for dividing the pressure chamber into a constant pressure chamber adapted to be in communication with a negative pressure source and a variable pressure chamber adapted to be selectively in communication with atmosphere and the constant pressure chamber, an d a movable power piston connected with the movable wall member. The movable power piston includes an outer cylindrical portion for sliding into then input side wall of the housing, an inner cylindrical portion disposed concentrically in the outer cylindrical portion, and a connecting portion connecting an outer peripheral portion of the inner cylindrical portion to an inner peripheral portion of the outer cylindrical portion. The connecting portion has an input side end portion that faces towards the input side of the movable power piston, and the input side end portion of the connecting portion gradually increases in axial length from the outer peripheral end portions to a remote end portion of the input side end portion. An annular negative pressure controlling valve seat is provided on the input side end portion of the inner cylindrical portion. A first path is provided in the connecting portion for communicating the variable pressure chamber with an inside space of the inner cylindrical body at all times and extends towards the radial direction of the movable power piston. An input member is provided in the inner cylindrical portion of the movable power piston and is axially movable upon brake actuation. An annular atmosphere controlling valve seat is provided on the input member. A second path is provided in the movable power piston and communicates the space between the inner peripheral portion of the outer cylindrical portion and the outer peripheral portion of the outer cylindrical portion with the constant pressure chamber at all times. An output member outputs a propulsion force on the movable power piston accompanying the movement of the movable wall member to outside the unit. A control member cooperates with the annular negative pressure controlling valve seat and the annular atmosphere controlling valve seat to selectively communicate the inside space of the inner cylindrical position with the space between the inner peripheral portion of the outer cylindrical portion and the outer peripheral portion of the inner cylindrical portion or with the atmosphere according to the movement of the input member against the movable power piston.

In the vacuum servo unit of the present invention, when the atmospheric air in the variable pressure chamber flows into the constant pressure chamber through the space between the inner cylindrical portion and the outer cylindrical portion, the atmospheric air hits against the input side end portion of the connecting portion. At this time, because the input side end portion of the connecting portion is convex in shape towards the input side, the stream of atmospheric air is divided at the top portion of the input side end portion. Thus, atmospheric air moves smoothly without falling into disorder along the exposed portion of the connecting portion that includes the input side end face of the input side end portion and is exposed to the space between the outer cylindrical portion and the inner cylindrical portion to flow into the constant pressure chamber. Thus, the servo force for the movable power piston, i.e., the output force of the vacuum servo unit, is smoothly decreased and the production of noise is restrained.

According to the vacuum servo unit of the present invention, the servo force for the movable power piston and the output force are decreased and the production of undesirable noise is avoided.

BRIEF DESCRIPTION OF THE DRAWING FIGURES

The foregoing and other features will become more readily apparent from the following description considered with reference to the accompanying drawing figures in which like elements are designated by like reference numerals and wherein.

DETAILED DESCRIPTION OF THE PREFERRED EMBODIMENTS

Figure 1:
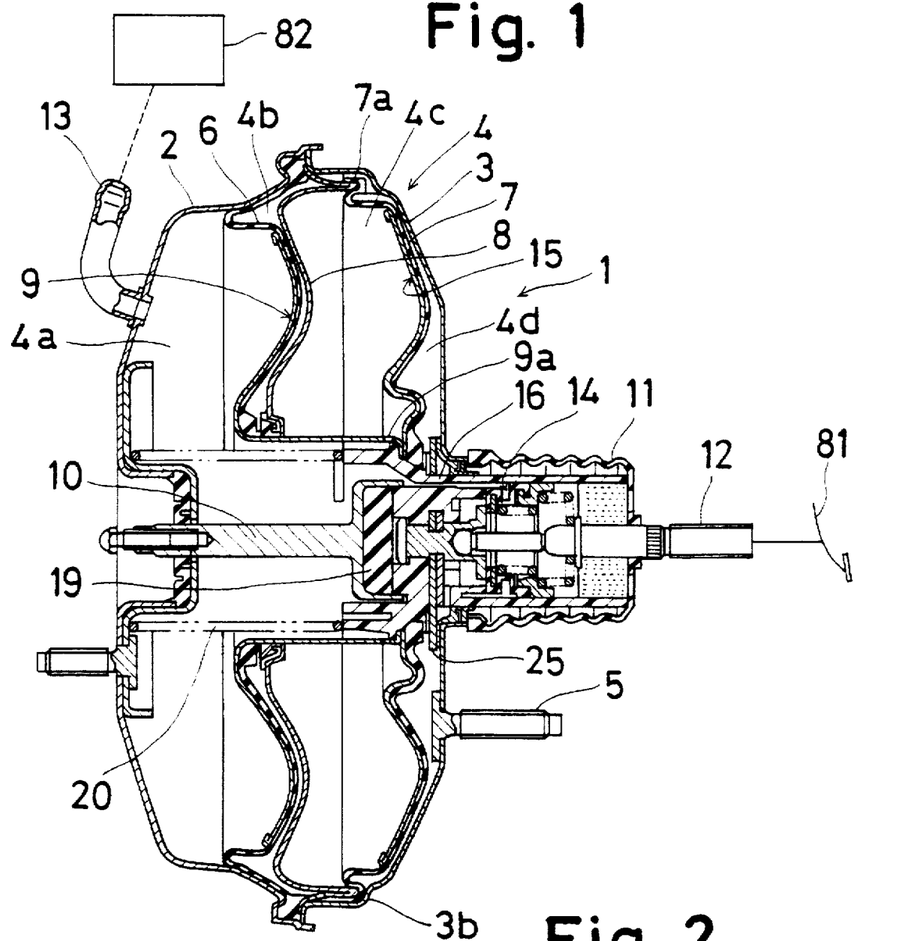
FIG. 1 is a cross-sectional view of a vacuum servo unit according to a first embodiment of the present invention.

Referring to FIG. 1, the vacuum servo unit according to a first embodiment of the present invention includes a housing 4 that is comprised of a front shell 2 and a rear shell 3. Defined within the housing 4 is a pressure chamber. As shown in more detail in FIG. 2, the outer circumferential end 3a of the rear shell 3 is in contact with a shoulder portion 2a of the front shell 2 so that the front and rear shells form the housing 4. The vacuum servo unit 1 also includes a plurality of stud bolts 5 installed on the rear shell 3 in the peripheral direction at regular intervals. The stud bolts 5 are adapted to be inserted through the dash panel (not shown) of a vehicle to fix the vacuum servo unit 1 to the vehicle.

A front movable wall member 9 is provided in the housing and has a front diaphragm 6, and a rear movable wall member 15 is provided in the housing and has a rear diaphragm 7. The outer peripheral end portion of the front diaphragm 6 is fixed between the front shell 2 and the rear shell 3. A partition wall member 8 is also disposed within the housing 4 to form a front pressure chamber and a rear pressure chamber. The partition wall member 8 is positioned between the front diaphragm 6 and the rear diaphragm 7.

The front pressure chamber, which is disposed at the left side of the partition wall member 8 as seen in FIG. 1, is divided in an air tight manner into a front constant negative pressure chamber 4a and a front variable pressure chamber 4b. The rear pressure chamber, which is disposed on the right side of the partition wall member 8 as seen in FIG. 1, is divided in an air tight manner into a rear constant negative pressure chamber 4c and a rear variable pressure chamber 4d. These chambers 4a, 4b, 4c, 4d are divided by way of the partition wall member 8, the front movable wall member 9, and the rear movable wall member 15.

Figure 2:
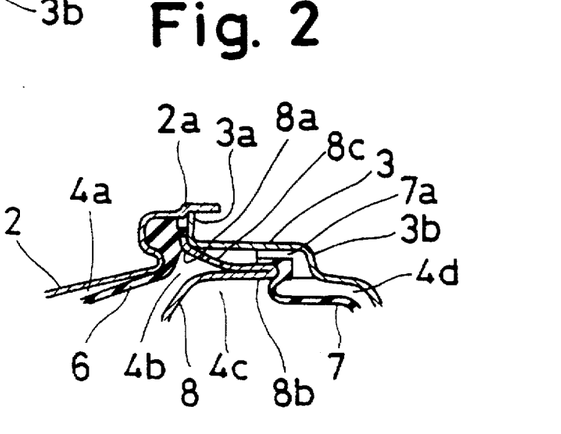
FIG. 2 is a partly enlarged cross-sectional view of a portion of the vacuum servo unit shown in FIG. 1 near the outer peripheral end portion of the front diaphragm.

As seen with reference to FIG. 2, the outer peripheral portion 8b of the partition wall member 8 comprises a first portion, a second portion and a third portion. The first portion extends towards the right in FIG. 2 so as to be parallel or generally parallel to the axis of the housing 4. The second portion, which has one end portion that is connected to one end portion of the first portion, turns back on the first portion at a bent region so as to extend towards the left in FIG. 2. The third portion, which has one end portion that is connected to the other end portion of the second portion, extends to the left in FIG. 2 from the second portion and gradually angles away from the second portion and the axis of the housing 4 so as to form a sloping portion. The third portion terminates at an outer peripheral edge portion 8a of the partition wall member 8 that projects generally radially outwardly. As can be seen from FIG. 2, the first portion and the second portion form a two layer construction. The outer peripheral end portion 8a is fixed between the front diaphragm 6 and the rear shell 3. In addition, the outer peripheral end portion of the rear diaphragm 7 is fixed between the bent portion of the outer peripheral portion 8b of the partition wall member 8 and a stepped portion 3b of the rear shell 3. By virtue of this construction, the partition wall member 8 is fixed in the housing 4.

Several communicating holes 8c are provided at regular intervals on the third portion of the outer peripheral portion 8b of the partition wall member 8, i.e., on the sloping portion of the outer peripheral portion 8b. Several communicating paths 7a in the form of passages are provided at regular intervals on the outer peripheral portion of the rear diaphragm 7. The communicating paths 7a are generally L-shaped. Communication between the front variable pressure chamber 4b and the rear variable pressure chamber 4d occurs at all times by way of the communicating holes 8c and the communicating paths 7a.

With reference once again to FIG. 1, air holes 9a are provided at regular intervals on the axially extending cylindrical portion of the front movable wall member 9. The air holes 9a maintain communication between the front constant pressure chamber 4a and the rear constant pressure chamber 4c. The front constant pressure chamber 4a is adapted to communicate with a negative pressure source 82, such as the intake manifold of an internal combustion engine, through an inlet 13 provided on the front shell 2, so that the front constant pressure chamber 4a and the rear constant pressure chamber 4c are constantly under negative pressure.

A movable power piston 16 made of a resin is inserted in the housing 2 from the open end portion of the rear shell 3. A cover 11 is provided on the outer peripheral portion of the movable power piston 16 to prevent dust and the like from entering into the housing 4. An output rod 10 is provided in front of the movable power piston 16 and extends through the front shell 2 to engage with a piston of the master cylinder.

Figure 3:
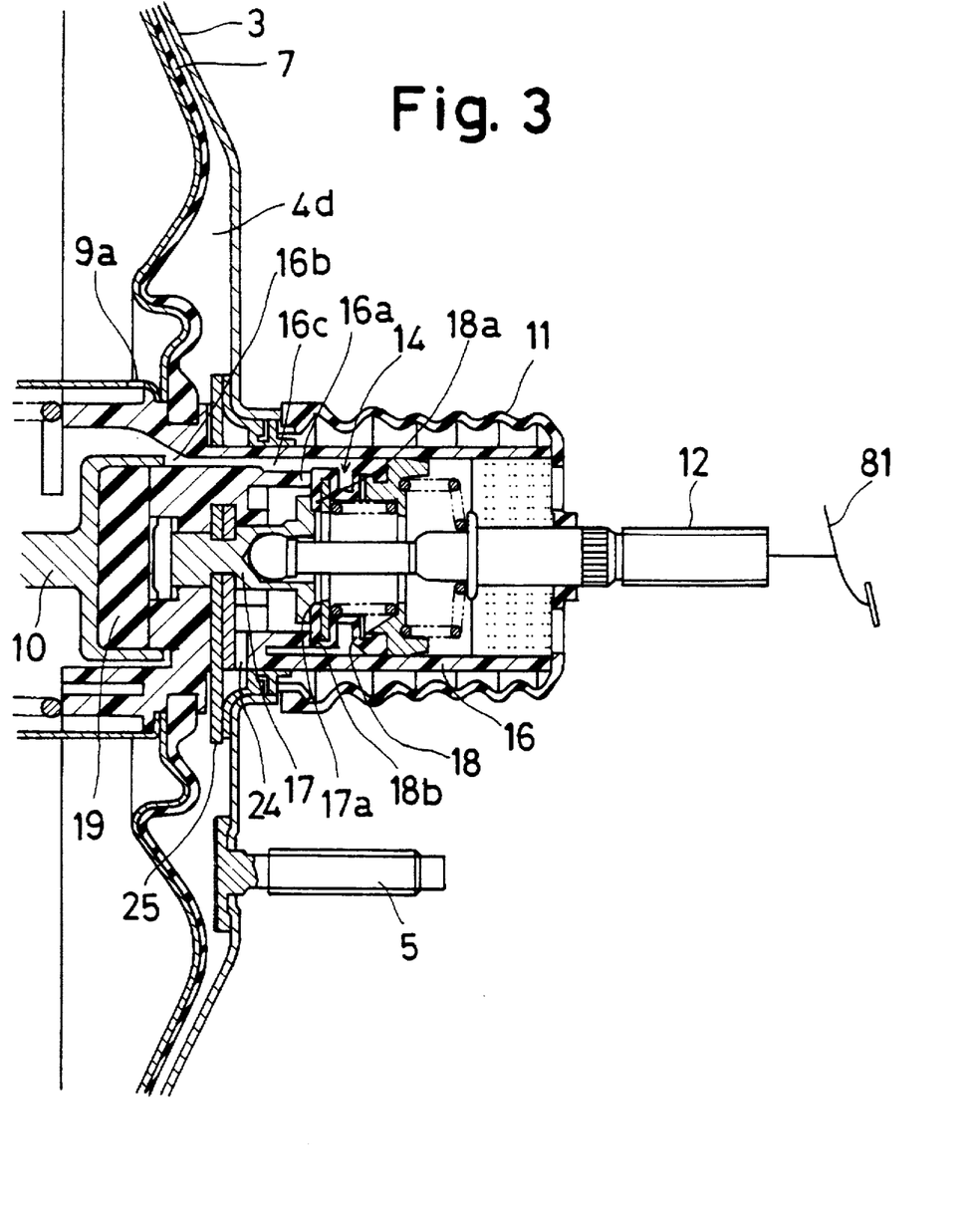
FIG. 3 is a partly enlarged cross-sectional view of a portion of the vacuum servo unit shown in FIG. 1 view near the control mechanism.

As seen in FIG. 3, an input rod 12 whose right end portion is connected with a brake operation member, for example a brake pedal 81, is inserted and located in the movable power piston 16. The input rod 12 is connected with an input member 17 so that the two are capable of moving together as one body. A control valve mechanism 14 is also provided in the movable power piston 16. The control valve mechanism is comprised of an annular atmosphere controlling valve seat 17a formed on the input member 17, an annular negative pressure controlling valve seat 16a, an atmosphere controlling seal portion 18a of the control valve 18, and a negative pressure controlling seal portion 18b of the control valve 18.

Referring back to FIG. 1, the right end portion of the cylindrical portion of the front movable wall member 9 is connected in an air tight manner with the outer peripheral portion of the front portion of the movable power piston 16. The inner peripheral end portion of the rear diaphragm 7 is connected in an air tight manner with the outer peripheral portion of the front portion of the movable power piston 16. An elastic ring member is provided on the inner peripheral end portion of the partition wall member 8. The cylindrical portion of the front movable wall member 9 slides on the elastic ring member.

A return spring 20 is disposed in the housing 4 between the front end portion of the movable power piston 16 and the front shell 2 to bias the movable power piston 16 towards the rear shell 3, i.e., towards the right in FIG. 1. A reaction disc 19 is positioned at one end of the output rod 10 so as to be located between the movable power piston 16 and the output rod 10.

Figure 4:
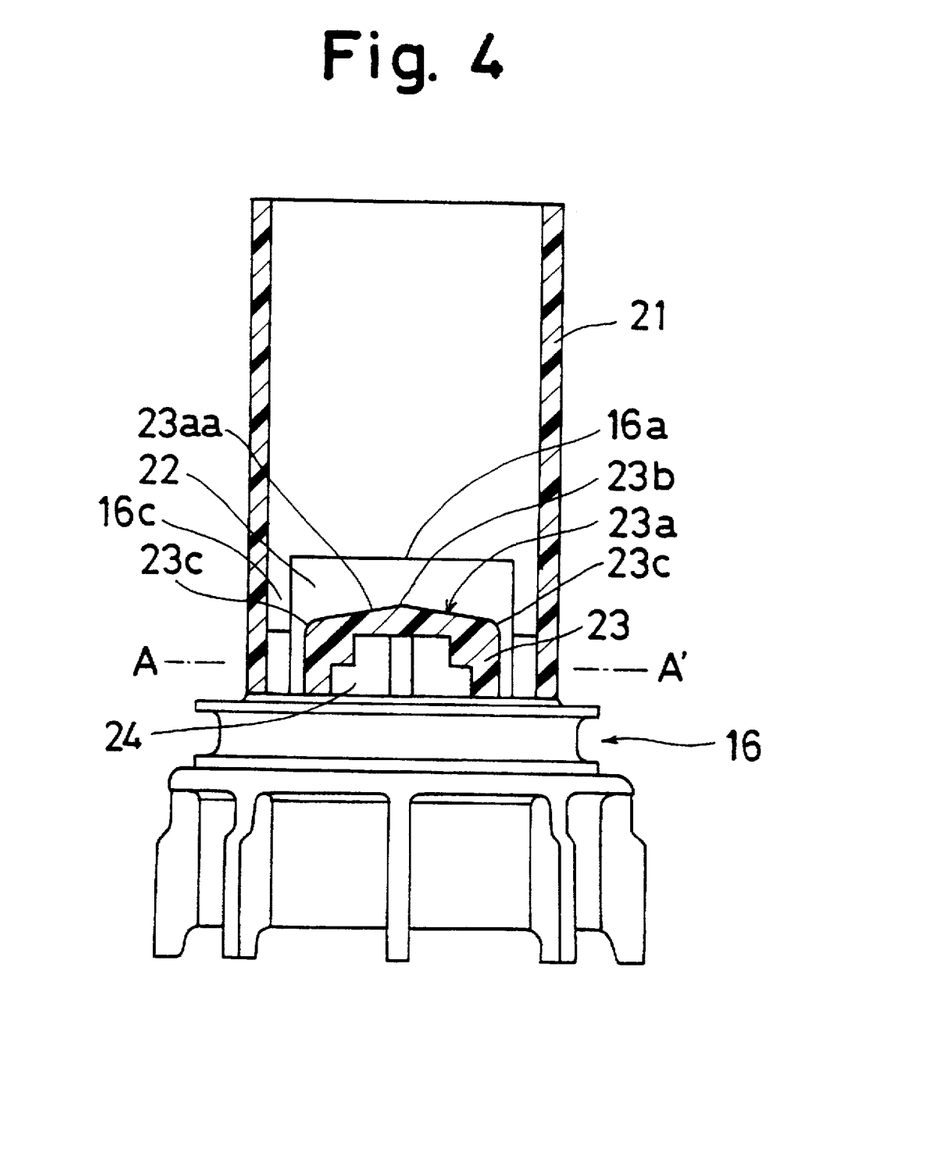
FIG. 4 is a partly enlarged cross-sectional view of the movable power piston shown in FIG. 1.
Figure 5:
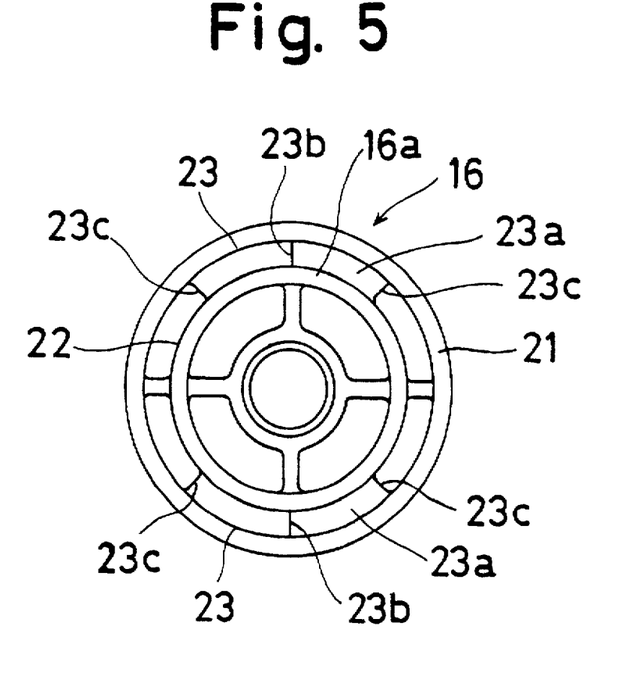
FIG. 5 is a top view of the movable power piston shown in FIG. 4.
Figure 6:
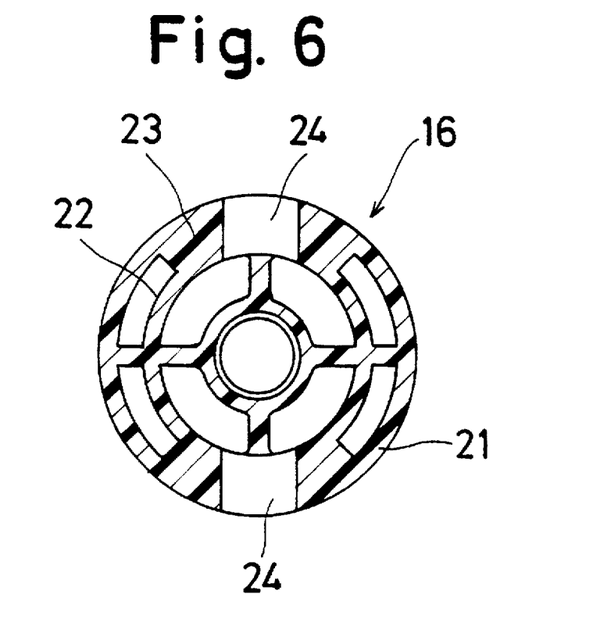
FIG. 6 is a cross-sectional view of the movable power piston along the section line VI—VI in FIG. 4.

As illustrated in FIGS. 4–6, the movable power piston 16 has an outer cylindrical portion 21 and an inner cylindrical portion 22. The outer cylindrical portion 21 is the outer peripheral side portion of the movable power piston 16, and slides into the input side wall of the housing 4 as seen in FIG. 1. The inner cylindrical portion 22 possesses the annular negative pressure controlling valve seat 16a at its input side end portion, i.e., the upper end portion in FIG. 4. Two connecting portions 23 are provided between the outer cylindrical portion 21 and the inner cylindrical portion 22 to connect the inner peripheral portion of the outer cylindrical portion 21 to the outer peripheral portion of the inner cylindrical portion 22. The outer cylindrical portion 21, the inner cylindrical portion 22, and the connecting portions 23 are formed integrally in one-piece as a single body.

Two first paths 24 which extend in the radial direction of the movable power piston 16 are respectively provided in the connecting portions 23 so that they pass through the outer cylindrical portion 21 and the inner cylindrical portion 22. The first paths 24 communicate the inner space of the inner cylindrical portion 22 with the rear variable pressure chamber 4d. In addition, the path 24 serves as an installation hole for a key member 25.

The input side end portion 23a of each connecting portion 23 which faces towards the side of the negative pressure controlling valve seat 16a, i.e., the upper side of the connecting portion 23 as seen in FIG. 4, possesses a configuration that is convex or dome shaped towards the input side, i.e., towards the upper side in FIG. 4, so that the width in the peripheral direction thereof decreases towards the input side. In particular, the input side end portion 23a is shaped to converge from the outer peripheral end portions 23c to a single top or remote end portion 23b. Thus, the input side end portion 23a is shaped to taper towards the input side in a plane crossing the first path 24, so that the end face 23aa of the input side end portion 23a is shaped in a sloping manner. Thus, the connecting portions 23 are shaped so that their axial length (i.e., the length parallel to the axis of the cylindrical portions 21, 22) progressively decreases from the remote end portion 23b towards both peripheral end portions 23c. Stated differently, the axial length of the input side end portion 23a gradually and progressively increases from the outer peripheral end portions to the remote end portion 23b.

The remote end portion or top portion 23b is located at the mid portion or mid point of the input side end portion 23a in a peripheral direction of the connecting portion 23. The outer peripheral end portions 23c representing corner portions of the connecting portion 23 are advantageously rounded.

In FIGS. 3 and 4, the input member 17 is located in the inner cylindrical portion 22 of the movable power piston 16. The control valve 18 is provided in the outer cylindrical member 21 of the movable power piston 16, and is located on the input side of the inner cylindrical portion 22, i.e., the right of the inner cylindrical portion 22 as seen with reference to FIG. 3.

FIGS. 1, 3, and 4 depict a second path 16b that is provided in the movable power piston 16. The second path 16b communicates the space 16c between the inner peripheral portion of the outer cylindrical portion 21 and the outer peripheral portion of the inner cylindrical portion 22 with the front constant pressure chamber 4a.

The operation of the vacuum servo unit 1 is as follows. When the brake pedal 81 is actuated by the driver, the input rod 12 connected with the brake pedal 81 receives the brake operation force and moves towards the left as seen in FIG. 1. The input member 17 that is fixed to the input rod 12 moves integrally with the input rod 12 towards the left in FIG. 2.

The atmosphere controlling seal portion 18a and the negative pressure controlling seal portion 18b of the control valve 18 are also moved towards the left by the biasing force of the valve spring with the input member 17 according to the movement of the first input member 17. The negative pressure controlling seal portion 18b contacts the negative pressure controlling valve seat 16a of the movable power piston 16, which cuts off communication between the space 16c and the inside space of the inner cylindrical portion 22, i.e., communication between the variable pressure chambers 4b, 4d and the constant pressure chambers 4a, 4c. Therefore, communication between the variable pressure chamber 4b, 4d and the negative pressure source 82 is cut off.

As the input member 17 moves further towards the left in FIG. 3, the engagement between the atmosphere controlling valve seat 17a and the atmosphere controlling seal portion 18a ceases, so that the inside space of the inner cylindrical portion 22 communicates with the atmosphere. That is, the variable pressure chambers 4b, 4d communicate with the atmosphere through the first paths 24, the inside space of the inner cylindrical portion 22, the clearance between the atmosphere controlling valve seat 17a and the atmosphere controlling seal portion 18a, the inside space of the outer cylindrical portion 21, and an air cleaner. Therefore, a pressure differential is generated between the constant pressure chambers 4a, 4c and the variable pressure chambers 4b, 4d by the inflow of atmospheric air into the variable pressure chambers 4b, 4d. The movable wall members 9, 15 receive the load force created by the pressure differential, and the movable power piston 16 connected with the movable wall members 9, 15 supplies an amplified brake force to the output rod 10 through the reaction disc 19. The output rod 10 outputs a propulsion force on the movable power piston 16, i.e., the amplified brake force to outside the vacuum servo unit 1.

When the driver judges that there is no need for a brake operation and the brake pedal 81 is returned, the input member 17 moves towards the right in FIG. 3 according to the return movement of the input rod 12. The atmosphere controlling valve seat 17a thus contacts the atmosphere controlling seal portion 18a, which cuts off communication between the inside space of the inner cylindrical portion 22 and the atmosphere, i.e., communication between the variable pressure chambers 4b, 4d and the atmosphere. As the input member 17 moves further towards the right, the end portion of the control valve 18 is pushed by the input member 17 to move towards the right in cooperation with the input member 17. Accordingly, the negative pressure controlling seal portion 18b moves away from the negative pressure controlling valve seat 16a, which communicates the space 16c with the inside space of the inner cylindrical portion 22, i.e., communicates the variable pressure chambers 4b, 4d with the constant pressure chambers 4a, 4c through the first path 24, the inside space of the inner cylindrical portion 22, the clearance between the negative pressure controlling valve seat 16a and the negative pressure controlling seal portion 18b, the space 16c between the inner peripheral portion of the outer cylindrical portion 21 and the outer peripheral portion of the inner cylindrical portion 22, and the second path 16b. The atmospheric air in the variable pressure chambers 4b, 4d flows into the constant pressure chamber 4a, 4c. Therefore, the degree of aggressive or assisted pressure in the variable pressure chambers 4b, 4d decreases and the servo force to the power piston 10 decreases. The movable power piston 16 and the input rod 12 are returned to the initial position by the biasing force of the spring 20 and the reaction force from the master cylinder (not shown).

When the atmospheric air in the variable pressure chambers 4b, 4d flows into the constant pressure chambers 4a, 4c through the space 16c between the outer cylindrical portion 21 and the inner cylindrical portion 22, the atmospheric air hits or impinges against the input side end portion 23a of the connecting portion 23. At this time, because the input side end portion 23a is tapered or dome shaped and the corners 23c are rounded, the stream of atmospheric air is divided at the remote end portion 23b. Thus, atmospheric air flows smoothly without falling into disorder along the exposed portion of the connecting portion 23 that includes the input side end face 23aa and is exposed to the space 16c between the outer cylindrical portion 21 and the inner cylindrical portion 22 to flow into the constant pressure chambers 4a, 4c. Thus, the servo force for the movable power piston 16, i.e., the output force of the vacuum servo unit 1 is smoothly decreased, and the production of undesirable sound and noise is restrained.

As can be appreciated from the foregoing, the present invention provides a vacuum servo unit 1 that advantageously allows the servo force of the movable power piston 16 to be smoothly decreased without the undesirable noise and shock typically associated with other known types of units of this type.

In addition, the vacuum servo unit 1 can obtain the strength of the inner cylindrical portion 22 because the input side end portion 23a of the connecting portion 23 is convex towards the input side.

In the first embodiment described above, the vacuum servo unit is described in terms of a tandem-type vacuum servo unit, but needless to say that the same advantages and effect can be obtained in the context of a single-type vacuum servo unit.

Figure 7:
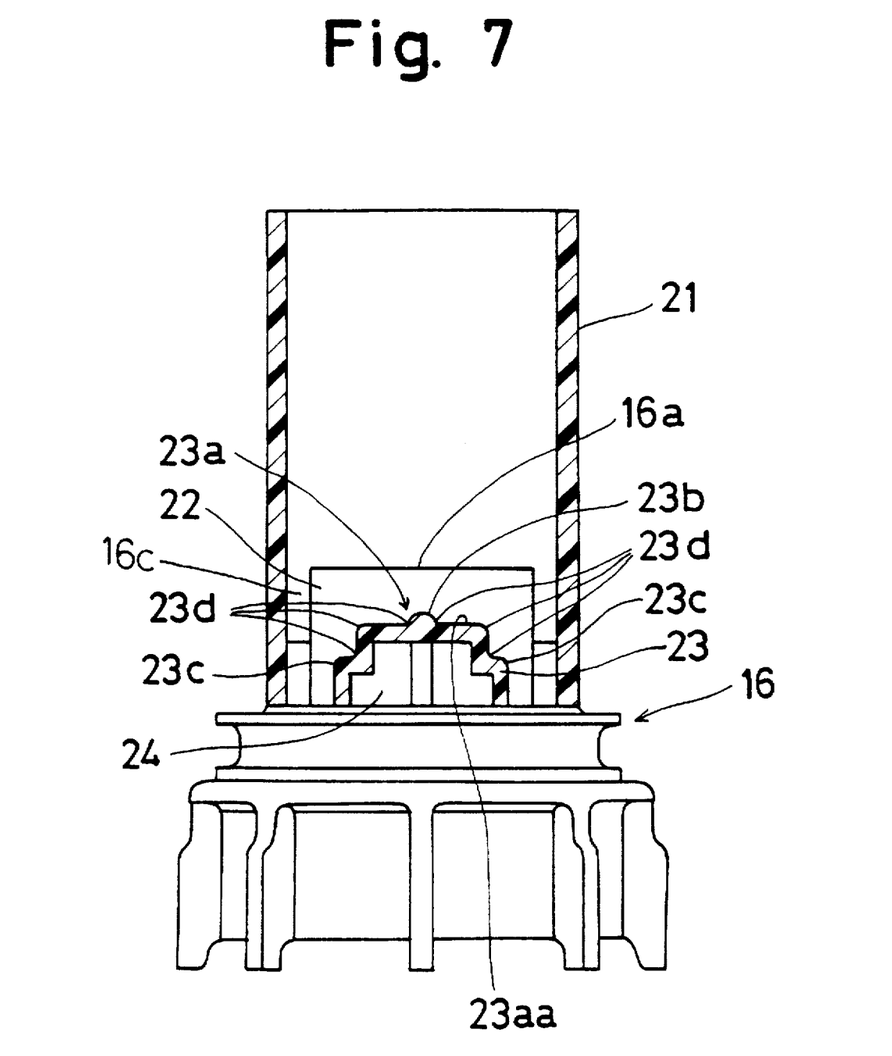
FIG. 7 is a partly cross-sectional view of the movable power piston according to a second embodiment of the present invention.

FIG. 7 illustrated a second embodiment of the present invention. The features of the second embodiment that correspond to those described above and illustrated in the drawing figures in connection wit the first embodiment are identified with the same reference numerals and a detailed description of such features is not repeated here.

Referring to FIG. 7, the movable power piston of the vacuum servo unit according to the second embodiment of the present invention is designed so that the movable power piston 16 has an outer cylindrical portion 21 and an inner cylindrical portion 22. The outer cylindrical portion 21 is the outer peripheral side portion of the movable power piston 16, and slides into the input side wall of the housing. The inner cylindrical portion 22 has the annular negative pressure controlling valve seat 16a at the input side end portion thereof, i.e., at the upper end portion as seen in FIG. 7. Connecting portions 23 are provided between the outer cylindrical portion 21 and the inner cylindrical portion 22 to connect the inner peripheral portion of the outer cylindrical portion 21 to the outer peripheral portion of the inner cylindrical portion 22. The outer cylindrical portion 21, the inner cylindrical portion 22, and the connecting portions 23 are integrally formed in one-piece to form a single body.

The first paths 24 that extend towards the radial direction of the movable power piston 16 are respectively provided in the connecting portions 23 to pass completely through the outer cylindrical portion 21 and the inner cylindrical portion 22. The first paths 24 communicate the inner side space of the inner cylindrical portion 22 with the variable pressure chamber 4d.

The input side end portion 23a facing towards the side of the negative pressure controlling valve seat 16a, i.e., the upper portion seen in FIG. 7 of the connecting portion 23, possesses a somewhat convex or dome shaped configuration towards the input side. That is, the input side end portion 23a is shaped with steps so that the width of the input side end portion 23a in a peripheral direction thereof decreases in a stepwise manner. In particular, the input side end portion 23a is shaped to stepwise converge from both outer peripheral end portions 23c thereof to a single top portion 23b thereof. The top portion 23b is located at the mid portion or mid point of the input side end portion 23a with respect to the peripheral direction of the connecting portion 23. The outer peripheral end portions 23c and the other corner portions 23c, 23d defining the stepped configuration of the input side end portion 23a are also advantageously rounded. The top or remote end portion 23b is shaped like a rib or projection. Thus, as in the case of the first embodiment described above, the input side end portion 23a of each connecting portion 23 is shaped so that its axial length (i.e., the length parallel to the axis of the cylindrical portions 21, 22) progressively decreases, in a stepwise manner, on either side from the top portion 23b to the peripheral end portions 23c. Stated differently, the axial length of the input side end portion 23a gradually and progressively increases from the outer peripheral end portions 23c to the remote end portion 23b.

When atmospheric air in the variable pressure chamber 4b, 4d flows into the constant pressure chamber 4a, 4c through the space 16c between the inner peripheral portion of the outer cylindrical portion 21 and the outer peripheral portion of the inner cylindrical portion 22, the atmospheric air hits or impinges against the input side end portion 23a of the connecting portion 23. At this time, because the input side end portion 23a is shaped in a stepwise form in a stair-like configuration, and since the remote end portion 23b is in the form of a rib or projection, and the corners 23c, 23d are rounded, the stream of atmospheric air is divided at the remote end portion 23b, so that the atmospheric air moves smoothly without falling into disorder along the exposed portion that includes the input side end face 23a and is exposed to the space 16c between the outer cylindrical portion 21 and the inner cylindrical portion 22 to flow into the constant pressure chamber 4a, 4c.

This embodiment of the invention provides advantages similar to those discussed above in connection with the first embodiment.

In the second embodiment described above, the input side end portion 23a of the connecting portion 23 is shaped in a stepwise or stair-like configuration, and converges at the remote end portion 23b. Needless to say that the input end portion 23a is not limited to this particular shape, but can also include other variations which achieve a similar result as in the present invention.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed:

1. A vacuum servo unit for a vehicle braking system comprising:

a housing in which is defined a pressure chamber;

a movable wall member provided in said housing for dividing said pressure chamber into a constant pressure chamber adapted to be in communication with a negative pressure source and a variable pressure chamber adapted to be selectively in communication with atmosphere and said constant pressure chamber;

a movable power piston connected with said movable wall member, said movable power piston having an input side, said movable power piston including an outer cylindrical portion for sliding into an input side wall of said housing, an inner cylindrical portion disposed concentrically in said outer cylindrical portion, and a connecting portion connecting an outer peripheral portion of the inner cylindrical portion to an inner peripheral portion of the outer cylindrical portion, said connecting portion having an input side end portion that faces towards the input side of the movable power piston, said input side end portion of said connecting portion being convexly shaped towards the input side so that the width of the input side end portion of said connecting portion decreases in a peripheral direction towards said input side;

a first path provided in said connecting portion for continuously communicating said variable pressure chamber with an inside space of said inner cylindrical portion, said first path extending in a radial direction of said movable power piston;

a second path provided in said movable power piston for continuously communicating a space between said inner peripheral portion of said outer cylindrical portion and said outer peripheral portion of said inner cylindrical portion with said constant pressure chamber;

an annular negative pressure controlling valve seat provided on an input side end portion of said inner cylindrical portion;

an input member provided in said inner cylindrical portion of said movable power piston and axially movable upon brake actuation;

an annular atmosphere controlling valve seat provided on said input member;

an output member for outputting a propulsion force on said movable power piston according to movement of said movable wall member; and a control member cooperating with said annular negative pressure controlling valve seat and said annular atmosphere controlling valve seat to selectively communicate said inside space of said inner cylindrical portion with said space between said inner peripheral portion of said outer cylindrical portion and said outer peripheral portion of said inner cylindrical portion or with the atmosphere according to movement of said input member relative to said movable power piston.

2. A vacuum servo unit as claimed in claim 1, wherein said input side end portion of said connecting portion includes corners that are rounded.

3. A vacuum servo unit as claimed in claim 1, wherein the width of said input side end portion of said connecting portion decreases in a stepwise manner so that said input side end portion is stepped in shape.

4. A vacuum servo unit as claimed in claim 1, wherein said input side end portion of said connecting portion is shaped to converge from both outer peripheral end portions thereof to a single top portion.

5. A vacuum servo unit as claimed in claim 4, wherein said top portion is located at a mid portion of the input side end portion with respect to a peripheral direction of said connecting portion.

6. A vacuum servo unit as claimed in claim 1, wherein said input side end portion of said connecting portion tapers towards said input side in a plane intersecting said first path, with an input side end face of said input side end portion of said connecting portion being provided with two sloping portions.

7. A vacuum servo unit as claimed in claim 1, wherein said input side end portion of said connecting portion possesses a shape that gradually converges towards a remote end of said input side end portion, said top portion having a projection.

8. A vacuum servo unit for a vehicle braking system comprising:

a housing in which is defined a pressure chamber;

a movable wall member provided in said housing for dividing said pressure chamber into a constant pressure chamber adapted to be in communication with a negative pressure source and a variable pressure chamber adapted to be selectively in communication with atmosphere and said constant pressure chamber;

a movable power piston connected with said movable wall member, said movable power piston having an input side, said movable power piston including an outer cylindrical portion for sliding into an input side wall of said housing, an inner cylindrical portion disposed concentrically in said outer cylindrical portion, and a connecting portion connecting an outer peripheral portion of the inner cylindrical portion to an inner peripheral portion of the outer cylindrical portion, said connecting portion having an input side end portion that faces towards the input side of the movable power piston, said input side end portion of said connecting portion including outer peripheral end portions, said input side end portion of said connecting portion gradually increasing in axial length from the outer peripheral end portions to a remote end portion of the input side end portion;

a first path provided in said connecting portion for continuously communicating said variable pressure chamber with an inside space of said inner cylindrical portion, said first path extending in a radial direction of said movable power piston;

a second path provided in said movable power piston for continuously communicating a space between said inner peripheral portion of said outer cylindrical portion and said outer peripheral portion of said inner cylindrical portion with said constant pressure chamber;

an annular negative pressure controlling valve seat provided on an input side end portion of said inner cylindrical portion;

an input member provided in said inner cylindrical portion of said movable power piston and axially movable upon brake actuation;

an annular atmosphere controlling valve seat provided on said input member;

an output member for outputting a propulsion force on said movable power piston according to movement of said movable wall member; and a control member cooperating with said annular negative pressure controlling valve seat and said annular atmosphere controlling valve seat to selectively communicate said inside space of said inner cylindrical portion with said space between said inner peripheral portion of said outer cylindrical portion and said outer peripheral portion of said inner cylindrical portion or with the atmosphere according to movement of said input member relative to said movable power piston.

9. A vacuum servo unit as claimed in claim 8, wherein said outer peripheral end portions are rounded.

10. A vacuum servo unit as claimed in claim 8, wherein said input side end portion of said connecting portion includes stepped portions extending between the outer peripheral end portions and the remote end portion.

11. A vacuum servo unit as claimed in claim 8, wherein said remote end portion is located at a mid point of the input side end portion with respect to a peripheral direction of said connecting portion.

12. A vacuum servo unit as claimed in claim 8, including a pair of connecting portions connecting the outer peripheral portion of the inner cylindrical portion to the inner peripheral portion of the outer cylindrical portion, both of said connecting portions having an input side end portion that faces towards the input side of the movable power piston, said input side end portion of each connecting portion gradually increasing in axial length from the outer peripheral end portions to a remote end portion of the respective input side end portion.

13. A vacuum servo unit as claimed in claim 8, including a partition wall member disposed in the housing to divide the pressure chamber into a front pressure chamber and a rear pressure chamber.

14. A vacuum servo unit as claimed in claim 13, wherein said movable wall member is a front movable wall member that divides the front pressure chamber into a front constant pressure chamber and a front variable pressure chamber.

15. A vacuum servo unit as claimed in claim 14, including a rear movable wall member disposed in the housing to divide the rear pressure chamber into a rear constant pressure chamber and a rear variable pressure chamber.

* * * * *